S. M. PERRY.
DETACHABLE HANDLE AND LEG FOR DUST PANS.
No. 260,120. Patented June 27, 1882.
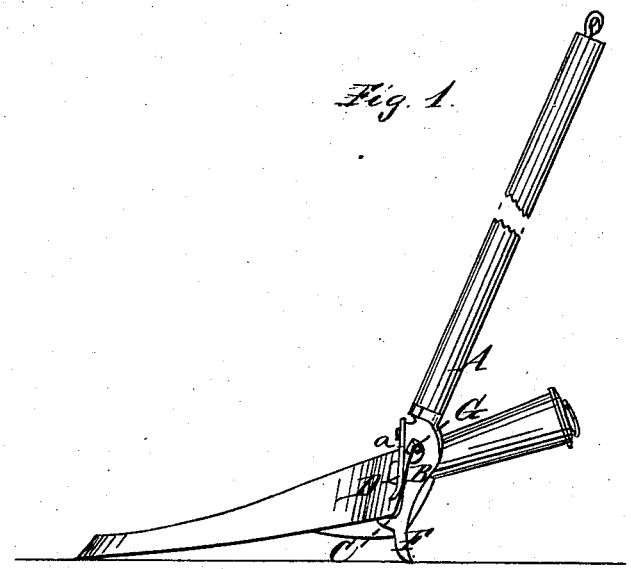
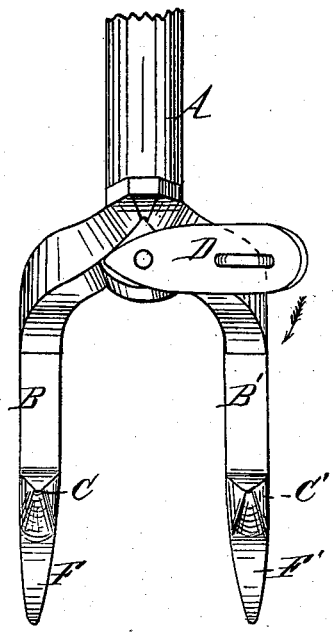
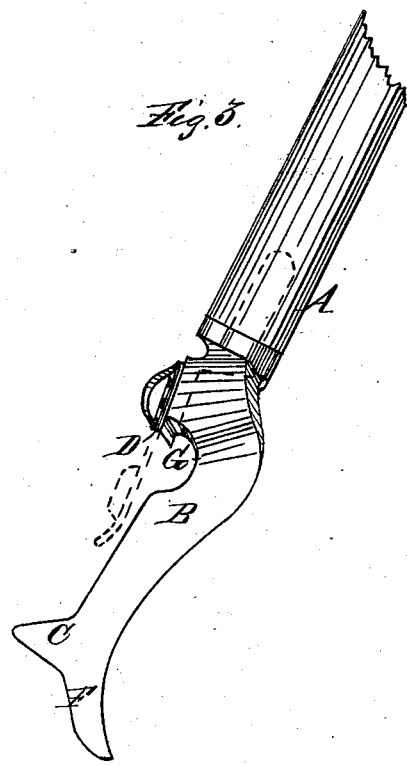
Witnesses
W. L. Bennem
Chas N Graves.
Inventor.
Saml. M. Perry

UNITED STATES PATENT OFFICE.

SAMUEL M. PERRY, OF PLAINFIELD, NEW JERSEY.

DETACHABLE HANDLE AND LEG FOR DUST-PANS.

SPECIFICATION forming part of Letters Patent No. 260,120, dated June 27, 1882.

Application filed December 8, 1879.

*To all whom it may concern:*

Be it known that I, SAMUEL M. PERRY, of Plainfield, in the county of Union and State of New Jersey, have made an invention of a new and useful Detachable Handle and Leg Arrangement for Dust-Pans; and I do hereby declare that the following is a full, clear, and exact description and specification of the same, reference being had to the accompanying drawings.

This device is intended principally as a portable attachment that a person may without trouble apply to almost any ordinary short-handled dust-pan that they may have in use without any alterations of the pan, and add greatly to its convenience. It thus becomes capable of being used with a common broom without the usual stooping, and the detachable leg portion, raising the hind portion of the pan sufficiently to throw the front edge of the same to the floor to receive its load, renders the pan self-supporting in an upright position.

To this end my invention consists of mechanical devices which are set forth in detail at the close of this specification.

In order that my said invention may be fully understood, I have represented in the accompanying drawings and will proceed to describe the invention which I have devised.

Figure 1 represents a dust-pan in section with my improvements attached. Fig. 2 represents a front view of the crotched handle detached from the pan. Fig. 3 represents a side view of the same.

The handle A, in the present example, is crotched or fork-shaped, and is made so for the purpose of straddling the short handle of an ordinary dust-pan.

B B' are legs, and upon these legs are projections C C'. These projections are for the bottom of the dust-pan to rest upon, and are located a certain distance from the terminus of the legs, so that when the bottom of the back wall of the pan rests upon them the front of the pan is in contact with the floor, ready to receive the sweepings. The holding of the dust-pan in this position is caused by the extending of the legs B B' below these projections so as to form feet F F' for the dust-pan.

A button, D, is fastened to the forked handle, and this button is for the purpose of securing the detachable handle more firmly to the dust-pan, as represented at A, Fig. 1. The legs B B' are made with a recess, as shown at G, for the purpose of receiving the top of the back wall of the dust-pan.

My device may be used in connection with new pans made without any permanent handle. It may also be applied as detachable legs alone, rendering the pan self-supporting while in use; or it may be applied as a detachable handle alone, without the legs, with good effect; but I consider it far superior when used with the legs connected with the detachable handle and both used together on the pan.

Of the above several points of holding-contact with the pan, some may be left off and still be capable of supporting the pan without any permanent holding-fastening riveted or soldered to the pan. For instance, the arrangement may rest on the top of the short handle and extend down and bear against the back of the pan, slightly hooking under the bottom. Another way would be to hook over the front of the top edge of the back wall of the pan, extend down against the outside of the back, and slightly hook under the bottom of the dust-pan. Another would be to bear against the outside of the back wall of the pan, and the adjustable button on the front side of the wall would hold it; but I greatly prefer to use all or most of these devices, as the hold on the pan is rendered thus firmer, and is still easily detachable, so that the pan may be suspended in as small and convenient a space as the ordinary pan.

What I claim as my invention, and desire to secure by Letters Patent, is—

1. A detachable handle for common household dust-pans, formed with a leg or legs to extend below the bottom of the back wall of pan when said handle is so arranged as to be clamped or buttoned to the outside of back wall of pan, substantially as hereinbefore set forth.

2. In combination with the rear part of an ordinary dust-pan, a detachable support or legs to raise the back portion of said pan, substantially as hereinbefore set forth.

3. The combination, with a detachable handle for dust-pans, of the legs or feet and handle, for purposes specified.

Witness my hand this 28th day of November, A. D. 1879.

SAML. M. PERRY.

Witnesses:
W. L. BENNEM,
CHAS. N. GRAVES.